No. 852,053. PATENTED APR. 30, 1907.
A. G. BESTGEN.
ATTACHMENT FOR HARVESTERS.
APPLICATION FILED JUNE 8, 1906.
2 SHEETS—SHEET 1.
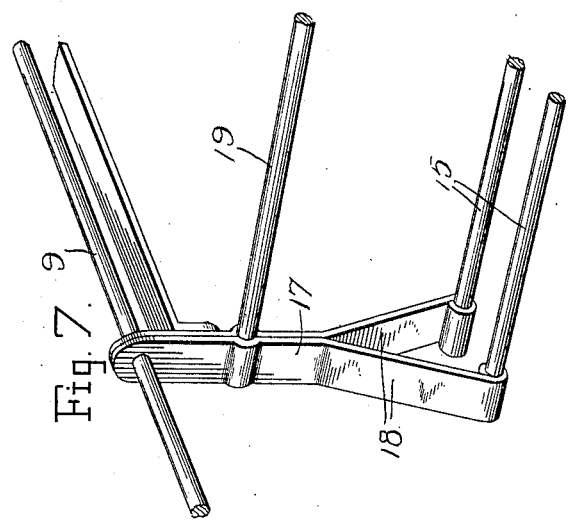
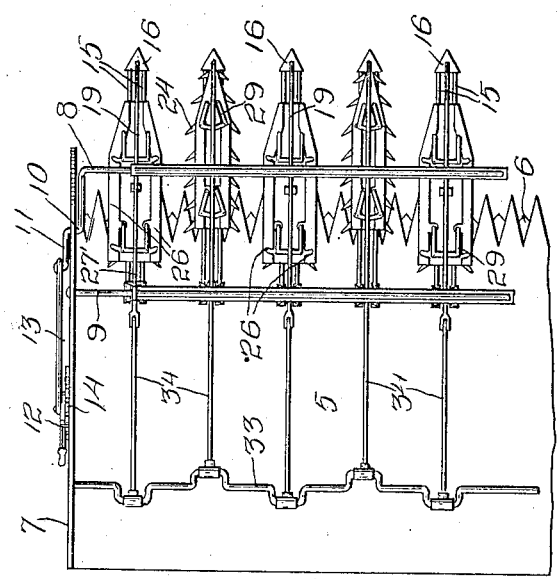
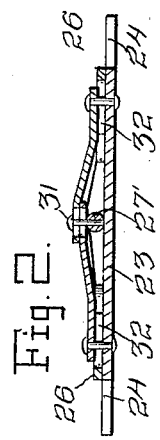

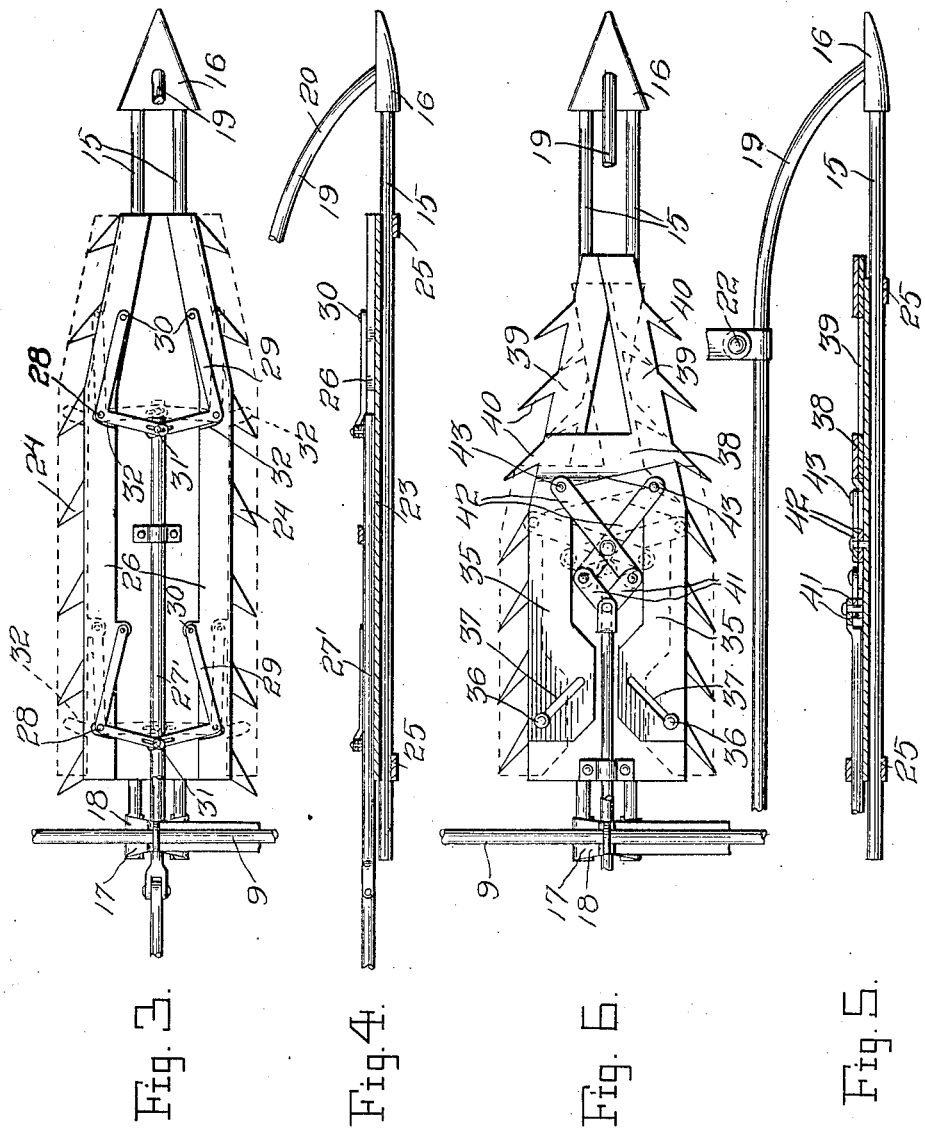

UNITED STATES PATENT OFFICE.

AUGUST G. BESTGEN, OF TIPTON, MISSOURI.

ATTACHMENT FOR HARVESTERS.

No. 852,053.  Specification of Letters Patent.  Patented April 30, 1907.

Application filed June 8, 1906. Serial No. 320,807.

*To all whom it may concern:*

Be it known that I, AUGUST G. BESTGEN, a citizen of the United States, residing at Tipton, in the county of Moniteau, State of Missouri, have invented certain new and useful Improvements in Attachments for Harvesters; and I do hereby declare the following to be a full, clear, and exact description of the invention, such as will enable others skilled in the art to which it appertains to make and use the same.

This invention relates to attachments for harvesters and has for its object to provide a mechanism which will draw the grain toward the cutting element of the harvester and deposit it, after it is cut, upon the table thereof. To attain this result, the invention contemplates the use of draw-combs and has for its further object to provide means for shielding the said combs during their outward movement.

A still further object of the invention is to provide a mechanism which will gather the grain which is "down" and lying in the direction of the travel of the harvester.

In the accompanying drawings: Figure 1 is a top plan view of a portion of a harvester showing my invention applied thereto, the Fig. 2 is a detail transverse sectional view through one of the draw-combs. Fig. 3 is a detail plan view of one of the draw-combs showing in dotted lines, the position of the combs during their forward movement. Fig. 4 is a detail vertical longitudinal sectional view through the comb, and, Fig. 5 is a similar view showing a slightly modified form of comb. Fig. 6 is a top plan view of a modified form of draw-comb, showing in dotted lines the position of the parts during the forward movement of the comb. Fig. 7 is a perspective view of the rear portion of one of the draw-combs.

Referring more specifically to the drawings, the numeral 5 denotes the platform of a harvester which includes the usual cutting apparatus 6 and the usual upstanding end frames 7.

Mounted for rocking movement in the end frames 7 of the machine and extending longitudinally of the platform 5 are arched draw-comb supporting frames 8 and 9 which serve to support the combs at their front and rear ends respectively and in a manner to be presently described. The comb supporting frame 8 is located forwardly of the frame 9 and includes a connecting portion and crank end portions 10 which extend at right angles to the connecting portion of the frame and are journaled in their respective ends of the frames 7. One of the crank end portions of the combs supporting-frame 8 is provided with a crank-arm 11 extending upwardly at right angles with respect to the related end portion 10 of which it is an extension and connecting this crank arm with a lever 12, which is pivoted upon the adjacent end frame 7 is a connecting rod 13, the said lever being arranged for co-operation with a segmental rack 14 carried by the said end frame.

It will be understood from the foregoing, that by rocking the lever 13, the draw-comb supporting frame will be correspondingly rocked, its connecting portion being raised and lowered by this operation to raise or lower the forward ends of the draw-combs to enable the combs to pick up the down stalks.

The draw-comb supporting frame 9 is similar in construction to the frame 8, the difference between the two frames being that in the crank-arm 11 is omitted in the frame 9 and this frame serves merely as a support for the rear end of the draw-comb although it, like the frame 8, is mounted for rocking movement to accommodate itself to movement of the draw-comb.

Each of the draw-combs comprises a pair of spaced parallel guide rods 15 which are secured at their forward ends to a shoe 16 and are supported at their rear ends by means of a bracket 17 which depends from the arched frame 9 and is provided with downwardly diverging supporting members 18 to which the rear end of the guide rods 15 are connected, the bifurcations being not only for the purpose of supporting the rear ends of guide-rods 15 in spaced relation, but also for the passage of the connecting rod from the drive-shaft to the combs, as will be presently explained. The forward ends of the guide-rods and the shoe 16 are supported by means of a brace-rod 19 which is secured at its rear end to the corresponding bracket 17 and extends forwardly and thence downwardly as at 20, and is connected with the said shoe 16, the said rod being supported adjacent its downwardly bent portion 20 by means of a link which is pivoted at its lower end to a bracket ear 22 secured to the said rod adjacent the said downturned portion and which depends from the connecting portion of the comb-supporting frame 8.

The combs each comprise a plate 23 which is provided along each of its longitudinal edges with a series of teeth 24, and the said plates are tapered at their forward portions, as shown in the drawings. Upon the under side of each plate are secured pairs of brackets 25 through which the guide-rods 15 are engaged, and by means of which the combs will be guided during their reciprocatory movement.

In order to protect the combs during their forward movement to keep them from shoving the grain away from the cutting apparatus and to uncover them during their rearward movement, to allow them to gather the grain toward the said apparatus, I provide a suitable shield mechanism, one embodiment of which is shown in the first four figures of the drawings. In these figures, the shield mechanism for each comb comprises a pair of plates 26 which extend longitudinally of the draw-combs and which are disposed for sliding movement thereupon, the said plates being of sufficient width to entirely cover the teeth of the combs when the said plates are at the limit of their movement from the longitudinal middle of the draw-combs. Slidably disposed upon the upper face of each draw-comb and guided in its movement thereon by means of bearing brackets 27 is a rod 27'. Pivoted upon the draw-combs, as at 28 are bell crank levers 29 which are connected as at 30 at the end of one of their arms with the adjacent plates 26, it being understood that the said bell-crank levers are pivoted upon opposite sides of the rod 27' and in spaced relation to the comb. The meeting ends of the other arms of the bell-crank levers are pivoted as at 31 to the respective rod 27'. It will be readily understood from the foregoing that the initial movement of the rod 27' will serve to lock the bell-crank levers which have one of their arms pivoted thereto and that further movement of the rods will serve to reciprocate their respective draw-combs.

In order that the plates 26 will not interfere with the pivot bolts 28 for the bell-crank levers 29, I form, in each of the said plates of each pair and in the opposing edges thereof, recesses 32 in which the pivots of the said bell crank levers are received when the plates are moved toward each other.

In order that the combs and shields may be properly operated, I provide a multiple crank-shaft 33 which is journaled at its ends in the end frames of the machine and extending from the cranks of the crank-shaft to the rear ends of the rods 27' are connecting rods 34 which serve to communicate motion from the crank-shaft to the draw-combs and their shield mechanisms.

It will be noted from the foregoing that during their forward movement, the teeth of the draw-comb will be entirely covered by the shield plates, but that during their rearward movement, the said teeth will be uncovered and will serve to draw the grain toward the cutting apparatus of the machine, it being understood, as previously stated, that the draw-combs may be tilted at their forward ends to pick up the down grain.

In the form shown in Figs. 5 and 6 of the drawings, plates 35 are slidably disposed upon the draw-comb plates and are held thereon and properly guided by means of pins 36 which project upwardly from the said draw-combs and extend through slots 37 formed in the said plates, the said slots being extended in planes which converge forwardly. The forward ends of the plates are turned laterally as at 38 so that one plate will overlie the other and are thence directed forwardly in converging planes as at 39, the said forwardly directed portions 39 being provided upon their outer edges with teeth 40, it being understood that the foremost ones of the draw-comb teeth are omitted in this instance and that their function is performed by the teeth above mentioned. Links 41 are pivoted in overlapped position to the forward end of each connecting rod and have their opposite ends pivotally connected with the adjacent ends of arms 42 which are pivoted as at 43 to the draw-comb plates in overlapped position and are pivotally connected at their extreme forward ends with the plates 38 at their point of lateral direction.

From the foregoing it will be readily understood that the initial movement of the rod 27' in a forward direction caused by the connection of the crank-shaft, will cause the links above described, to spread and will consequently move the rear portions of the plates 38 outwardly from each other and their forwardly directed portions inwardly toward each other in each instance, preventing the comb teeth from performing their functions and that when the said rod 27' is moved rearwardly, the rear portions of the plate 38 will be moved inwardly toward each other by reason of the slots formed therein and by reason of the links just described, the forwardly directed portions of the plates will be moved outwardly from each other to allow their teeth to form the function of drawing the grain to the cutting apparatus.

It is to be understood that I do not desire to be limited to the exact details of construction shown and described, for obvious modifications will occur to a person skilled in the art.

What is claimed is:

1. The combination with a platform of a harvester, of draw-combs mounted for reciprocatory movement thereon, and shields slidably mounted upon said draw-combs and arranged to cover the same during their forward movement.

2. The combination with a platform of a harvester, of draw-combs mounted for reciprocatory movement thereon, and shields arranged to cover said combs during their forward movement.

3. The combination with the platform of a harvester, of draw-combs mounted for reciprocatory movement thereon, shields slidably mounted upon said draw-combs, a shaft mounted upon said platform, rods connecting said shaft and said draw-combs whereby the latter may be reciprocated, and connections between said rod and said shields whereby the latter may be moved to cover the said draw-combs during their forward movement.

4. The combination with the platform of a harvester, of draw-combs mounted upon said platform and arranged for reciprocatory movement thereon, a crank-shaft mounted upon said platform, rods connecting said crank-shaft and said draw-combs, bell-crank levers pivotally mounted upon said draw-combs, and having one of each of their arms connected to said rods, and shields slidably mounted upon said draw-combs and connected to the other of the arms of each of said bell-crank levers.

In testimony whereof, I affix my signature, in presence of two witnesses.

AUGUST G. BESTGEN.

Witnesses:
 Louis L. Lutz,
 Andrew Schmidt.